United States Patent
Ishikawa et al.

(10) Patent No.: US 7,310,290 B2
(45) Date of Patent: Dec. 18, 2007

(54) TRACKING LEARNING/ADJUSTING METHOD AND OPTICAL DISK DEVICE

(75) Inventors: Yoshinori Ishikawa, Yokohama (JP); Taku Hoshizawa, Kawasaki (JP); Fumio Isshiki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 617 days.

(21) Appl. No.: 10/933,947

(22) Filed: Sep. 3, 2004

(65) Prior Publication Data
US 2005/0117474 A1   Jun. 2, 2005

(30) Foreign Application Priority Data
Dec. 2, 2003   (JP) .............................. 2003-402576

(51) Int. Cl.
*G11B 7/00*   (2006.01)
(52) U.S. Cl. ............................. 369/44.26; 369/44.29; 369/47.37; 369/275.1
(58) Field of Classification Search ............. 369/47.37
See application file for complete search history.

(56) References Cited

U.S. PATENT DOCUMENTS

| | | | | |
|---|---|---|---|---|
| 4,566,090 A | * | 1/1986 | Eberly ...................... | 369/47.37 |
| 4,700,335 A | * | 10/1987 | Aoi .......................... | 369/47.37 |
| 5,220,556 A | * | 6/1993 | Shimizu ................... | 369/275.1 |
| 5,581,539 A | * | 12/1996 | Horie et al. ............. | 369/275.1 |
| 5,815,473 A | * | 9/1998 | Takahashi et al. ....... | 369/44.26 |
| 6,044,049 A | * | 3/2000 | Fujiune et al. ........... | 369/44.29 |
| 6,853,609 B2 | * | 2/2005 | Kusumoto et al. ....... | 369/44.29 |
| 6,917,571 B2 | * | 7/2005 | Kusumoto et al. ....... | 369/44.29 |
| 2005/0237879 A1 | * | 10/2005 | Kondo et al. ............ | 369/44.26 |

FOREIGN PATENT DOCUMENTS

| | | |
|---|---|---|
| JP | 04-315826 A | 11/1992 |
| JP | 05-266498 | 10/1993 |
| JP | 05-266499 | 10/1993 |
| JP | 06-020291 A | 1/1994 |
| JP | 11-149668 A | 6/1999 |
| JP | 2001-167452 A | 6/2001 |
| JP | 2002-025079 | 1/2002 |
| JP | 2003-123333 | 4/2003 |

* cited by examiner

*Primary Examiner*—William Korzuch
*Assistant Examiner*—Peter Vincent Agustin
(74) *Attorney, Agent, or Firm*—Townsend and Townsend and Crew LLP (57) ABSTRACT

Even in an optical disk which includes, within a single disk, plural record areas whose track-pitches differ from each other, a tracking parameter is adjusted in a short time and with a high accuracy. At first, an optical pickup for reading information recorded in the optical disk is displaced into a reference track-pitch area which is one of the plural record areas of the optical disk. Moreover, the tracking gain is adjusted so that the tracking servo gain in this area may exhibit a predetermined characteristic. Also, the value thus acquired is recorded into, e.g., a non-volatile memory. After that, based on the tracking parameter learned/adjusted in the reference track-pitch area, the tracking parameter in another track-pitch area is calculated using the track-pitch ratio therebetween. Thereby it becomes possible to adjust the tracking parameter in a short time and with a high accuracy.

26 Claims, 7 Drawing Sheets

TRACK PITCH = 0.35 μm

FIG. 2B

TRACK PITCH = 0.32 μm

TRACKING LEARNING/ADJUSTING METHOD AND OPTICAL DISK DEVICE

INCORPORATION BY REFERENCE

The present application claims priority from Japanese application JP 2003-402576 filed on Dec. 2, 2003, the content of which is hereby incorporated by reference into this application.

BACKGROUND OF THE INVENTION

1. Field of the Invention

The present invention relates to a tracking learning/adjusting method of learning a tracking parameter in an optical disk, and an optical disk device using the same method. Here, the optical disk includes, within the single disk, plural record areas whose track-pitches differ from each other.

2. Description of the Related Art

As optical disks, i.e., optical information record media for recording/reproducing information by irradiation with laser light or the like, various types of optical disks have been proposed and have come into practical use. According to, e.g., JP-A-2003-123333, of the various types of optical disks, there has been already known an optical disk which includes, within the single disk, plural record areas whose track-pitches differ from each other depending on the areas. Incidentally, the concrete optical disk proposed in this patent literature is as follows: This optical disk performs the record/reproduction of information by using one and the same generation method of a TE signal even in the areas whose track-pitches differ from each other.

Also, in the optical disk which includes, within the single disk, the plural record areas whose track-pitches differ, as a method of implementing the stable tracking servo, the following method has been disclosed in, e.g., JP-A-2002-25079: Namely, in this method, the track-pitches of the areas are measured each, and, depending on the differences therebetween, the generation method of the tracking error signal (which, hereinafter, will be referred to as "TE signal") is switched.

This switching is performed because optimum generation methods of the TE signal differ in the respective record areas. For example, assume a case where there are mixed a reproduction-specific compact disk (hereinafter, referred to as "CD-ROM") area with the track pitch=1.6 μm and one type of digital versatile disks (hereinafter, referred to as "DVDs"), e.g., a reproduction-specific DVD (hereinafter, referred to as "DVD-ROM") area with the track pitch=0.74 μm. In this case, in the former CD-ROM area, the 3-spot method is the TE signal's optimum generation method. Meanwhile, in the latter DVD-ROM area, the DPD method is the TE signal's optimum generation method.

Moreover, assume a case where there are mixed the above-described DVD-ROM area and a rewritable-type DVD (hereinafter, referred to as "DVD-RAM") area with the track pitch=0.615 μm. In this case, in the former DVD-ROM area, the DPD method is the TE signal's optimum generation method. Meanwhile, in the latter DVD-RAM area, the Push-Pull method is the TE signal's optimum generation method. In this way, the technology disclosed in JP-A-2002-25079 is, after all, as follows: In the areas whose track-pitches differ from each other, the generation methods which differ from each other and are optimum for the respective areas are used in order to generate the TE signal corresponding thereto. Also, patent literatures JP-A-5-266498 and JP-A-5-266499 have been already known.

SUMMARY OF THE INVENTION

In JP-A-2003-123333 described above, the disclosure has been made concerning the TE signal's generation methods of generating the TE signal for the optical disk which includes, within the single disk, two types of areas, i.e., a reproduction-specific area whose track-pitch is equal to 0.35 μm and a record/reproduction area whose track-pitch is equal to 0.32 μm. Both of the areas of the optical disk disclosed in the conventional technology are of a groove-shaped track structure using a phase-change material. This condition makes it possible to use the Push-Pull method as the TE signal's generation methods in a manner common thereto. In this case, however, there exist problems, which will be explained hereinafter.

Figure 2A:
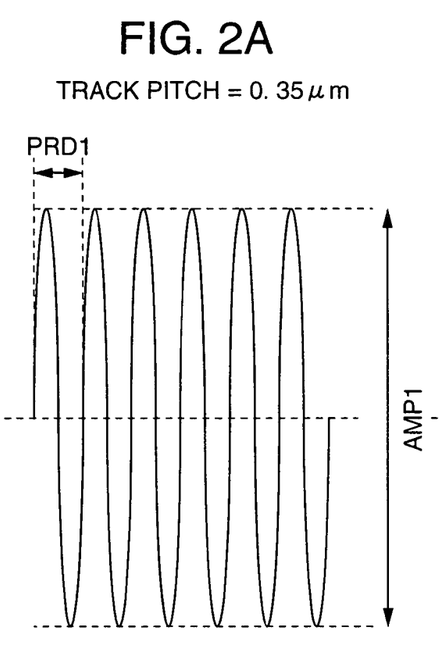
FIG. 2A and FIG. 2B are the waveform schematic diagrams for illustrating the push-pull signals in the cases where the track-pitches are equal to 0.35 µm and 0.32 µm.
Figure 2B:
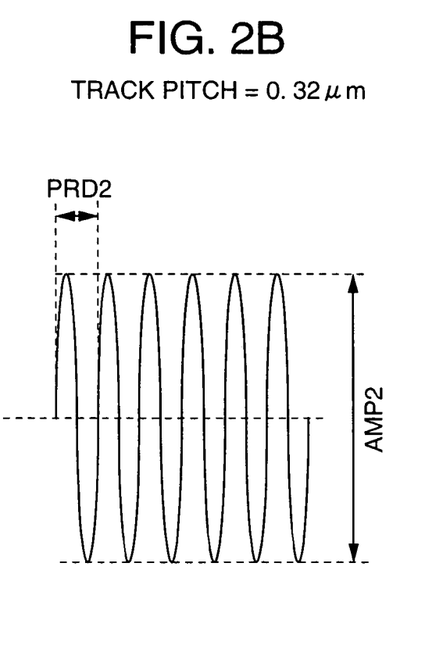

First, FIGS. 2A and 2B which accompany the present specification illustrates push-pull signals in both of the areas whose track-pitches are equal to 0.35 μm and 0.32 μm respectively. First, FIG. 2A illustrates a push-pull signal in the case of the track pitch=0.35 μm, and the amplitude is equal to AMP1. Meanwhile, FIG. 2B illustrates a push-pull signal in the case of the track pitch=0.32 μm, and the amplitude is equal to AMP2. Making a comparison between the amplitudes AMP1 and AMP2 indicates that the amplitude AMP1 for which the track pitch is larger becomes larger than the amplitude AMP2 in principle, and that the ratio therebetween becomes equal to substantially 1.5 to 1. On the other hand, one period of each of the TE signals is proportional to each of the track-pitches. FIG. 2 illustrates, as notations PRD1 and PRD2, times of the one periods of these TE signals in the cases of the track pitch=0.35 μm and track pitch=0.32 μm respectively. Incidentally, the ratio between these times of the one periods PRD1 and PRD2 is equal to the ratio between the track-pitches, and accordingly becomes equal to 0.35 to 0.32, i.e., 1.09 to 1.

Also, here, since inclinations of tangents in zero-crosses (i.e., intersection points with 0 level) of the above-described TE signals are detection sensitivities of track shifts, the inclinations are equivalent to a portion of the tracking loop gain. Here, with respect to each of FIG. 2A and FIG. 2B, the inclination of the zero-cross tangent (hereinafter, referred to as "detection sensitivity") will be determined hereinafter.

The above-described push-pull signals can be approximated using sinusoidal waves. Accordingly, assuming that the frequency of the TE signal X in FIG. 2B is equal to f, the TE signal X in FIG. 2A can be represented as $$X = 1.5 \times \sin(2\pi \times (1/1.09) \times f \times t). \quad \text{(expression 1)}$$

The detection sensitivity a to be determined is acquired by differentiating the above-described expression 1 with respect to time t, and accordingly a is given by $$\alpha = 1.5 \times 2\pi \times (1/1.09) \times f \times \cos(2\pi \times (1/1.09) \times f \times t). \quad \text{(expression 2)}$$

Moreover, the detection sensitivity $\alpha_0$ in the zero-cross corresponds to the case of t=0, and accordingly $\alpha_0$ is given by $$\alpha_0 = 1.5 \times 2\pi \times (1/1.09) \times f. \quad \text{(expression 3)}$$

Meanwhile, in the case of FIG. 2B, the TE signal X can be represented as $$X = \sin(2\pi \times f \times t). \quad \text{(expression 4)}$$

Similarly to the above-described case, its detection sensitivity α is acquired by differentiating the above-described expression 4 with respect to time t, and accordingly α is given by $$\alpha = 2\pi \times f \times \cos(2\pi \times f \times t). \quad \text{(expression 5)}$$

Moreover, its detection sensitivity $\alpha_0$ in the zero-cross also corresponds to the case of t=0, and accordingly $\alpha_0$ is given by $$\alpha_0 = 2\pi \times f. \quad \text{(expression 6)}$$

Form the above-described calculations, the detection sensitivities $\alpha_0$ in FIG. 2A and FIG. 2B are equal to $1.5 \times 2\pi \times (1/1.09) \times f$ and $2\pi \times f$, respectively. Consequently, the ratio therebetween becomes equal to $1.5 \times (1/1.09)$ to 1, i.e., 1.38 to 1. As a consequence, the detection-sensitivity ratio (=1.38) can be determined from $$\text{the detection-sensitivity ratio} = \text{the amplitude ratio} \div \text{the track-pitch ratio.} \quad \text{(expression 7)}$$

This means that, in the case of FIG. 2A and FIG. 2B (namely, the case where the track-pitches are 0.35 μm and 0.32 μm which differ from each other), the tracking gain becomes equal to 1.38 to 1. Accordingly, the difference is equal to substantially 2.8 dB. Here, if the eccentric centers of the optical disk described in JP-A-2003-123333 and the definitions of the residual tolerance error are identical to each other in both of the areas whose track-pitches differ from each other, it is desirable that the tracking servo characteristics be identical to each other in both of these areas. Consequently, there exists the necessity for switching this tracking gain so that the tracking servo characteristics will become identical to each other between the respective areas.

The implementation of this switching, however, requires that an optical pickup be positioned in each area so as to learn/adjust the tracking gain in each area. This causes a problem to occur that the learning time becomes longer. Also, since the area with the track-pitch=0.32 μm is the record/reproduction area, a case can be considered of course where an unrecorded part and a recorded part whose reflectances differ from each other are mixed therein. However, in the case like this where the unrecorded part and the recorded part are mixed, the tracking gain differs depending on whether the position at which the learning/adjustment is to be performed exists in the unrecorded part or in the recorded part, or the positions include both of these parts (i.e., the positions are mixed). This allows the implementation of the stable learning/adjustment.

Accordingly, the present invention has been accomplished in view of the above-described problems in the conventional technologies. Consequently, an object of the present invention is to provide a tracking learning/adjusting method which makes it possible to learn the above-described tracking parameter in a short time and with a high accuracy in an optical disk, and an optical disk device using the same method. Here, the optical disk includes, within the single disk, plural record areas whose track-pitches differ from each other.

Namely, the present invention has been accomplished based on the following recognition: In the optical disk which includes, within the single disk, the plural record areas whose track-pitches differ from each other, the tracking parameter learned/adjusted in one track-pitch area has a correlation relationship with the tracking parameter in another track-pitch area. As a result, the use of the track-pitch ratio therebetween makes it possible to calculate the tracking parameter in another track-pitch area.

Accordingly, in the present invention, in order to accomplish the above-described object, a tracking learning/adjusting method in an optical disk is proposed, the optical disk including, within the single disk, plural record areas whose track-pitches differ from each other. Here, the tracking learning/adjusting method includes the steps of displacing an optical detection unit into a reference track-pitch record area which is one of the plural record areas, the optical detection unit being used for reading information recorded in the optical disk, adjusting a tracking gain so that a tracking servo gain in the reference track-pitch record area will exhibit a predetermined characteristic, calculating, from a value acquired by the adjustment, a tracking gain in another record area whose track-pitch differs from the reference track-pitch, and thereby adjusting tracking gains in the plural record areas.

Also, in the present invention, in the above-described tracking learning/adjusting method, the following characteristics are preferable: The track-pitch of the reference track-pitch record area is larger than the track-pitch of another record area, or the reference track-pitch record area where the adjustment of the tracking gain is performed is a reproduction-specific record area of the optical disk, or the amplitude of a tracking error signal is used when performing the adjustment of the tracking gain. Also, the following characteristics are preferable: Either of the Push-Pull method and the differential Push-Pull method is used as the generation method of generating the tracking error signal, and further, the generation method of generating the tracking error signal is common to all of the plural record areas whose track-pitches differ from each other. Also, the following characteristics are preferable: The adjustment method of adjusting the tracking gain in the reference track-pitch record area is performed by injecting an external disturbance with a predetermined frequency into a tracking servo loop, and making the adjustment so that the phase difference between the external disturbance injected and a signal will become equal to a predetermined value, the signal having returned after making a one-round trip along the servo loop.

Moreover, in the present invention, in the above-described tracking learning/adjusting method, the following characteristics are preferable: The tracking gain Y in another track-pitch record area is determined using the following expression:

$$Y = X \div (m + n/Rt),$$

where X is the value acquired by the adjustment, Rt being the ratio between another track-pitch and the reference track-pitch, m and n being constants, or the constants m and n being recorded into a non-volatile memory after having been calculated once, or the constants m and n being determined using the following expressions:

$$m = (1 - A2/A1) \div (1 - Tp2/Tp1)$$

$$n = (A2/A1 - Tp2/Tp1) \div (1 - Tp2/Tp1),$$

where Tp1 is the track-pitch in the reference track-pitch record area, Tp2 being the track-pitch in another track-pitch record area, A1 being a push-pull signal amplitude in the reference track-pitch record area, and A2 being a push-pull signal amplitude in another track-pitch record area.

Otherwise, in the present invention, in the above-described tracking learning/adjusting method, the following characteristics are preferable: The tracking gain Y in another track-pitch record area is determined using the following expression:

$$Y=X\div\{K\times Rt+(1-K)\},$$

where X is the value acquired by the adjustment, Rt being the ratio between another track-pitch and the reference track-pitch, K being a constant, or the constant K being recorded into a non-volatile memory after having been calculated once, or the constant K being determined using the following expression:

$$K=(1-G1/G2)\div(1-Tp2/Tp1),$$

where Tp1 is the track-pitch in the reference track-pitch record area, Tp2 being the track-pitch in another track-pitch record area, G1 being the tracking-gain adjusted value in the reference track-pitch record area, and G2 being the tracking-gain adjusted value in another track-pitch record area.

In addition, according to the present invention, in order to accomplish the above-described object similarly, there is provided an optical disk device for optically performing reproduction of recorded information from an optical disk, or record/reproduction of information into/from the optical disk, the optical disk including, within the single disk, plural record areas whose track-pitches differ from each other. Here, the optical disk device includes an optical detection unit for reading information recorded in the optical disk; a computation unit for computing a tracking error signal on the basis of the optical detection unit; a displacement unit for displacing the optical detection unit into a reference track-pitch record area which is one of the plural record areas; a gain unit for adjusting a set value of a tracking servo gain for each of the record areas whose track-pitches differ from each other; and a gain adjustment unit for adjusting the set value by the gain unit so that the tracking servo gain in the reference track-pitch record area will exhibit a predetermined characteristic, wherein the gain unit calculates, from the set value, set values of tracking servo gains in the track-pitch record areas other than the reference track-pitch record area, the set value being adjusted in the reference track-pitch record area by the gain adjustment unit.

Moreover, in the present invention, in the above-described optical disk device, the following characteristics are preferable: The track-pitch of the reference track-pitch record area is larger than the track-pitch of another record area, or the reference track-pitch record area where the adjustment of the tracking gain is performed is a reproduction-specific record area of the optical disk, or the optical disk device further includes an amplitude measurement unit for detecting the amplitude of the tracking error signal when performing the adjustment of the tracking gain, or the gain adjustment unit performs the adjustment so that the amplitude of the tracking error signal in the reference track-pitch record area will become equal to a predetermined amplitude.

Furthermore, the following characteristics are preferable: The tracking error signal is generated using either of the Push-Pull method and the differential Push-Pull method, and further, the generation method of generating the tracking error signal is common to all of the plural record areas whose track-pitches differ from each other.

In addition, in the present invention, in the above-described optical disk device, the following characteristics are preferable: The optical disk device further includes an external-disturbance injection unit for injecting an external disturbance with a predetermined frequency into a tracking servo loop, and a phase-difference measurement unit for measuring phase difference between the external disturbance injected and the signal which has returned after making a one-round trip along the servo loop, wherein the adjustment is made so that the measurement value by the phase-difference measurement unit will become equal to a predetermined value. Otherwise, in the above-described optical disk device, the following characteristics are preferable: The tracking gain Y in another track-pitch record area is determined using the following expression:

$$Y=X\div(m+n/Rt),$$

where X is the value acquired by the adjustment, Rt being the ratio between another track-pitch and the reference track-pitch, m and n being constants, and the constants m and n being recorded into a non-volatile memory after having been calculated once, or the constants m and n being determined using the following expressions:

$$m=(1-A2/A1)\div(1-Tp2/Tp1)$$

$$n=(A2/A1-Tp2/Tp1)\div(1-Tp2/Tp1),$$

where Tp1 is the track-pitch in the reference track-pitch record area, Tp2 being the track-pitch in another track-pitch record area, A1 being a push-pull signal amplitude in the reference track-pitch record area, and A2 being a push-pull signal amplitude in another track-pitch record area.

Otherwise, in the present invention, in the above-described tracking learning/adjusting method, the following characteristics are preferable: The tracking gain Y in another track-pitch record area is determined using the following expression:

$$Y=X\div\{K\times Rt+(1-K)\},$$

where X is the value acquired by the adjustment, Rt being the ratio between another track-pitch and the reference track-pitch, K being a constant, or the constant K being recorded into a non-volatile memory after having been calculated once, or the constant K being determined using the following expression:

$$K=(1-G1/G2)\div(1-Tp2/Tp1),$$

where Tp1 is the track-pitch in the reference track-pitch record area, Tp2 being the track-pitch in another track-pitch record area, G1 being the tracking-gain adjusted value in the reference track-pitch record area, and G2 being the tracking-gain adjusted value in another track-pitch record area.

Namely, according to the present invention, even in the optical disk which includes, within the single disk, the plural record areas whose track-pitches differ from each other, through the execution of only the computation from the value acquired by the adjustment of the tracking servo gain in a partial area thereof, it is possible to acquire the tracking servo gain in another area whose track-pitch differs from that of the partial area. This allows the implementation of the optical disk device which makes it possible to perform the excellent record/reproduction operation by adjusting the tracking servo gain (i.e., parameter) in a short time and with a high accuracy.

Other objects, features and advantages of the invention will become apparent from the following description of the embodiments of the invention taken in conjunction with the accompanying drawings.

DESCRIPTION OF THE EMBODIMENTS

Hereinafter, referring to the accompanying drawings, the detailed explanation will be given below concerning embodiments of the present invention.

Figure 1:
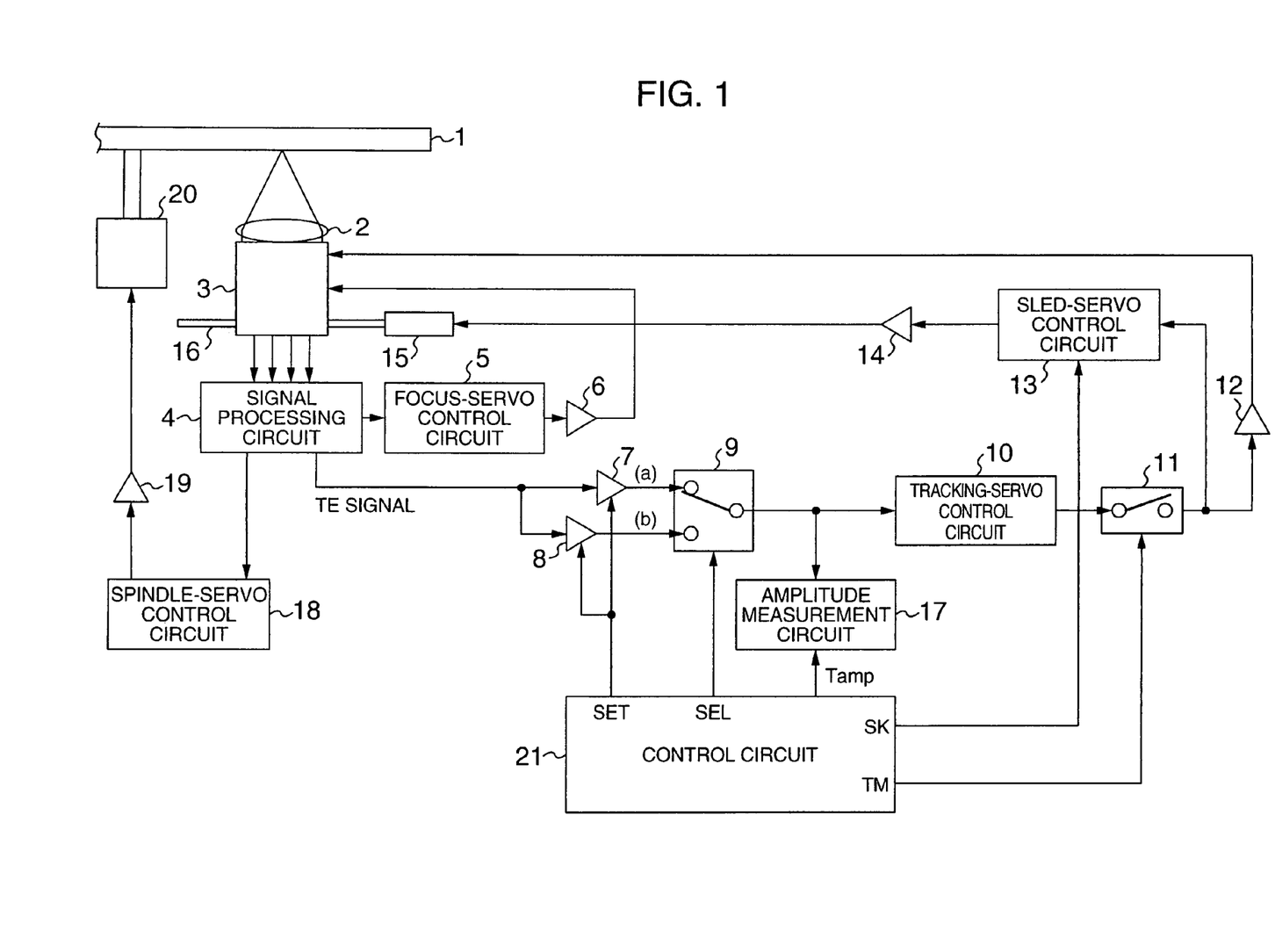
FIG. 1 is a block diagram of the tracking learning device according to a first embodiment of the present invention.

First of all, FIG. 1, which accompanies the present specification, is a block diagram for illustrating the entire configuration of the optical disk device according to a first embodiment of the present invention. In FIG. 1, a reference numeral 1 denotes an optical disk from/into which the reading, deletion, or writing of information is performed by irradiation with laser light, and which is rotationally driven at a predetermined speed by a spindle motor 20.

Also, a reference numeral 2 in the diagram denotes an objective lens. This objective lens 2 gathers and converges the laser light, thereby achieving the focus on a record layer of the optical disk 1. A numeral 3 denotes an optical pickup, which includes a focus actuator for driving the objective lens 2 in the optical-axis direction of the laser light, and a tracking actuator for driving the objective lens 2 in the disk-radius direction of the optical disk 1. Incidentally, in the present embodiment, the optical pickup 3 further includes an optical detector needed for acquiring a TE signal by the so-called Push-Pull method. Moreover, the optical pickup 3 converts reflected light from the optical disk 1 into electrical signals, then supplying the electrical signals to a signal processing circuit 4 which will be explained below.

A numeral 4 denotes the signal processing circuit. The signal processing circuit 4 processes the output signals from the optical pickup 3, thereby outputting a focus error signal corresponding to a shift of the focus, the TE signal corresponding to a shift of the tracking, and a spindle signal indicating the rotation state of the spindle. Also, a numeral 5 denotes a focus-servo control circuit. The focus-servo control circuit 5 outputs a signal acquired by performing compensation for the gain and phase with respect to the focus error signal supplied from the signal processing circuit 4. Here, the compensation for the gain and phase is needed for improving the stability and following performance of the focus servo. Moreover, a numeral 6 denotes a driver circuit. The driver circuit 6 receives and amplifies an output signal from the focus-servo control circuit 5, and outputs a signal for driving the focus actuator inside the optical pickup 3, thereby changing the position of the objective lens 2 in the optical-axis direction.

Also, a numeral 7 in the diagram denotes a gain circuit. The gain circuit 7 multiplies the TE signal by a first coefficient, then supplying its output signal to an input (a) of a switching circuit 9. Similarly, a numeral 8 also denotes a gain circuit. The gain circuit 8, however, multiplies the TE signal by a second coefficient, then supplying its output signal to an input (b) of the switching circuit 9.

Furthermore, the numeral 9 denotes the switching circuit. If a control signal SEL outputted by a control circuit 21 is at a Low level, the switching circuit 9 makes the switching to the input signal on the side (a), then outputting this input signal. Meanwhile, if the control signal SEL is at a High level, the switching circuit 9 makes the switching to the input signal on the side (b), then outputting this input signal. Also, a numeral 10 denotes a tracking-servo control circuit. The tracking-servo control circuit 10 supplies, to a switch 11, a signal acquired by performing compensation for the gain and phase with respect to the TE signal supplied from the signal processing circuit 4. Here, the compensation for the gain and phase is needed for improving the stability and following performance of the tracking servo. If a control signal TM outputted by the control circuit 21, which will be explained below, is at a High level, this switch 11 outputs the signal supplied from the tracking-servo control circuit 10. Meanwhile, if the control signal TM is at a Low level, this switch 11 outputs a 0-level signal.

A numeral 12 denotes a driver circuit. The driver circuit 12 amplifies the signal supplied from the switch 11, and outputs a signal for driving the tracking actuator inside the optical pickup 3, thereby changing the position of the objective lens 2 in the disk-radius direction. Also, a numeral 13 denotes a sled-servo control circuit. The sled-servo control circuit 13 receives the signal supplied from the switch 11, then outputting a signal acquired by performing compensation for the gain thereto in order to improve the following performance of the sled servo. Incidentally, this sled-servo control circuit 13 controls the position of the optical pickup 3 so that the objective lens 2 displaced by the tracking actuator inside the optical pickup 3 will not exceed a displacement limit. Also, at the seek time when the optical pickup 3 is displaced onto a desired track, the sled-servo control circuit 13 operates in accordance with a control signal SK outputted by the control circuit 21 which will be explained below.

A numeral 14 denotes a driver circuit, which amplifies the output signal from the sled-servo control circuit 13 and then supplies the amplified signal to a sled motor 15. Also, the numeral 15 denotes the sled motor, which drives an optical-pickup displacement mechanism 16 in accordance with the signal supplied from the sled-motor driving circuit 14. Moreover, the numeral 16 denotes the optical-pickup displacement mechanism, which displaces the optical pickup 3 in the internal-circumference direction or external-circumference direction of the optical disk 1. Also, a numeral 17 denotes an amplitude measurement circuit. The amplitude measurement circuit 17 measures the amplitude of the output signal from the switching circuit 9, then supplying the measured amplitude to the control circuit 21 which will be explained below.

Furthermore, a numeral 18 in the diagram denotes a spindle-servo control circuit. The spindle-servo control circuit 18 receives the spindle signal supplied from the signal processing circuit 4, then performing a processing for rotating the spindle motor 20 at a predetermined rotation speed. Also, a numeral 19 denotes a driver circuit, which amplifies an output signal from the spindle-servo control circuit 18, thereby rotating the spindle motor 20 which will be explained below. Incidentally, this spindle motor 20 rotates the optical disk 1 in response to an output signal from the driver circuit 19. In addition, the numeral 21 in the diagram denotes the control circuit. The control circuit 21 outputs a SET signal for setting the above-described gain circuits 7 and 8, the SEL signal for controlling the switching circuit 9, the TM signal for controlling the switch 11, and the SK signal for controlling the sled-servo control circuit 13 at the seek time. Also, the output signal from the amplitude measurement circuit 17 is inputted into the control circuit 21. Additionally, this control circuit 21 can be configured using a general CPU.

Figure 3:
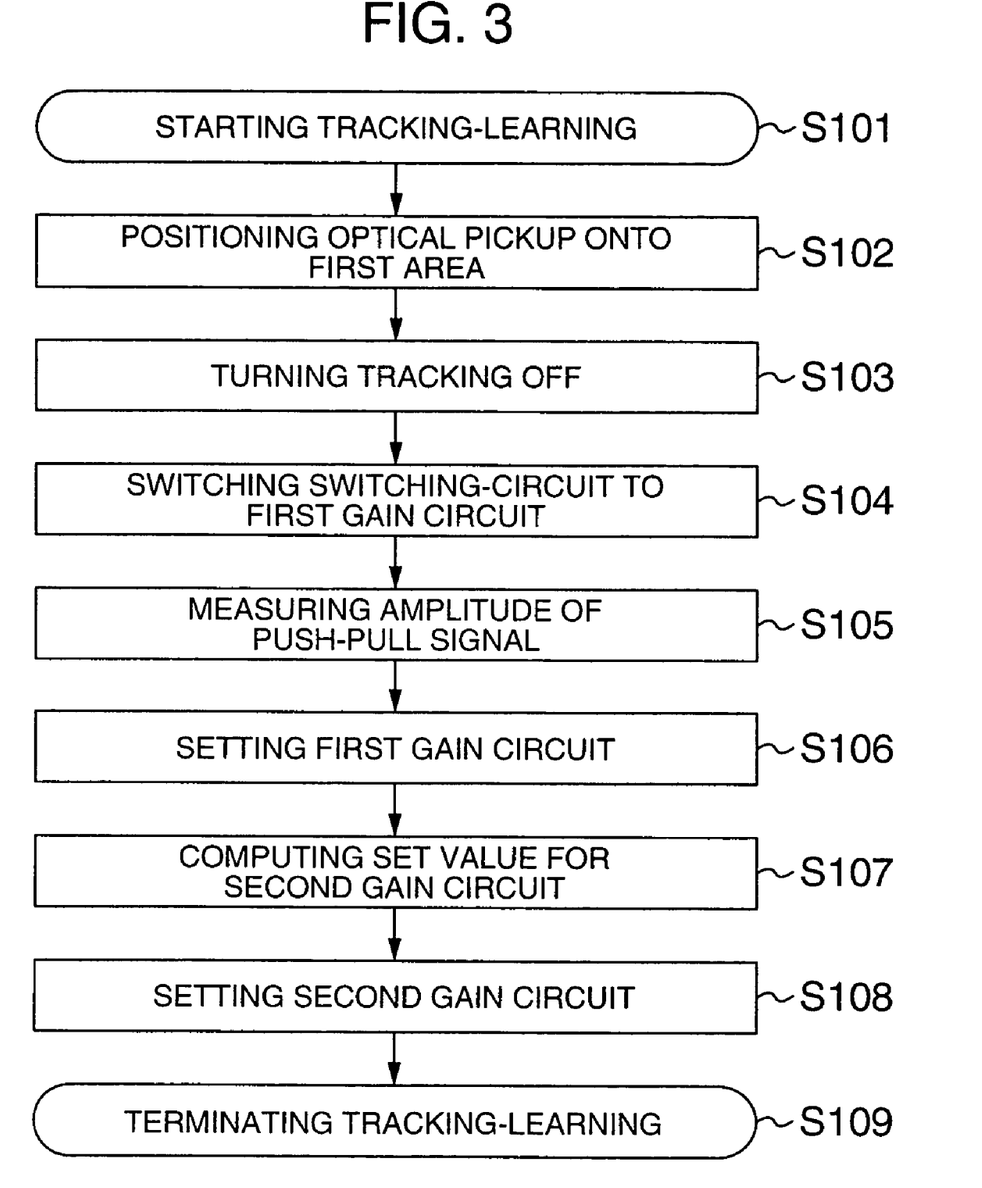
FIG. 3 is a flowchart for explaining the first embodiment of the present invention.

Hereinafter, in addition to FIG. 1 which accompanies the present specification, further referring to FIG. 3 as well, the detailed explanation will be given below concerning the tracking learning/adjusting method in the configuration explained above. Incidentally, FIG. 3 is a flowchart for explaining the tracking learning/adjusting method according to the first embodiment of the present invention.

First of all, in FIG. 1 explained above, assume that the optical disk 1 is rotated at a predetermined speed by the spindle motor 20 and simultaneously, the optical disk 1 is in a state where the focus servo is operated in a stationary manner by the focus-servo control circuit 5. In the state like this, when the tracking learning is started (step S101), the control circuit 21, using the control signal SK, positions the optical pickup 3 onto a first area of the optical disk 1 (step S102). Incidentally, here, it is preferable that the first area be a reproduction-specific area. The reason for this is as follows: If this first area is not the reproduction-specific area but is, e.g., a record/reproduction area, it turns out that a recorded part and an unrecorded part are mixed at the position of this learning/adjustment. This, as was pointed out earlier, makes it difficult to perform the accurate adjustment. Accordingly, the learning/adjustment is performed in the reproduction-specific area whose reflectance always remains unchanged. This makes it possible to perform the accurate adjustment.

Next, the control circuit 21 outputs a Low-level signal as the control signal TM, thereby turning the switch 11 OFF. This turns the tracking control OFF (step S103). Moreover, the control circuit 21 outputs a Low-level signal as the control signal SEL, thereby switching the switching circuit 9 onto the input side (a). This selects the gain circuit 7. Namely, it turns out that, of the two gain circuits, the switching circuit 9 is switched to the first gain circuit (step S104).

At this time, the focus control is in the ON state, whereas the tracking control is in the OFF state. As a result, the output signal that the switching circuit 9 is outputting is the push-pull signal illustrated in FIG. 2 explained earlier. Furthermore, the amplitude measurement circuit 17 measures the amplitude of this push-pull signal (step S105).

Here, in order to cause the tracking servo gain to exhibit a predetermined characteristic, the push-pull signal to be inputted into the tracking-servo control circuit 10 needs to have a predetermined amplitude. Then, assuming that the amplitude measured at the above-described step S105 by the amplitude measurement circuit 17 is Tamp and the predetermined amplitude is Tref, the control circuit 21 sets Tref/Tamp to the gain circuit 7. Namely, the first gain circuit is set (step S106). As a result of this, the amplitude of the push-pull signal to be inputted into the tracking-servo control circuit 10 becomes equal to the predetermined amplitude Tref.

After that, the control circuit 21 multiplies Tref/Tamp, which has been set to the gain circuit 7, by a predetermined coefficient β which will be explained later. Based on this multiplication, the control circuit 21 computes β×Tref/Tamp, thereby computing a set value for the second gain circuit (step S107). After that, the control circuit 21 sets this computation result to the gain circuit 8 (step S108), then terminating the tracking learning (step S109).

Here, the explanation will be given below concerning the coefficient β used for computing the set value for the above-described second gain circuit. Namely, in the example in FIG. 2A and FIG. 2B described earlier, the tracking-gain ratio is equal to 1.38 to 1 as was explained earlier. Accordingly, by setting β=1.38, the coefficient which is 1.38 times larger as compared with that of the gain circuit 7 is set to the gain circuit 8. As a result of this setting, in either of the case of the reproduction-specific area whose track-pitch differs therefrom and further the case of the record/reproduction area, its tracking servo gain is allowed to remain unchanged. This allows the implementation of the stable tracking-servo control.

Incidentally, the above-described setting example of the coefficient β is about the case where the track-pitches are equal to 0.32 μm and 0.35 μm. Next, the consideration will be given to a case where these values are replaced by general expressions.

Figure 4:
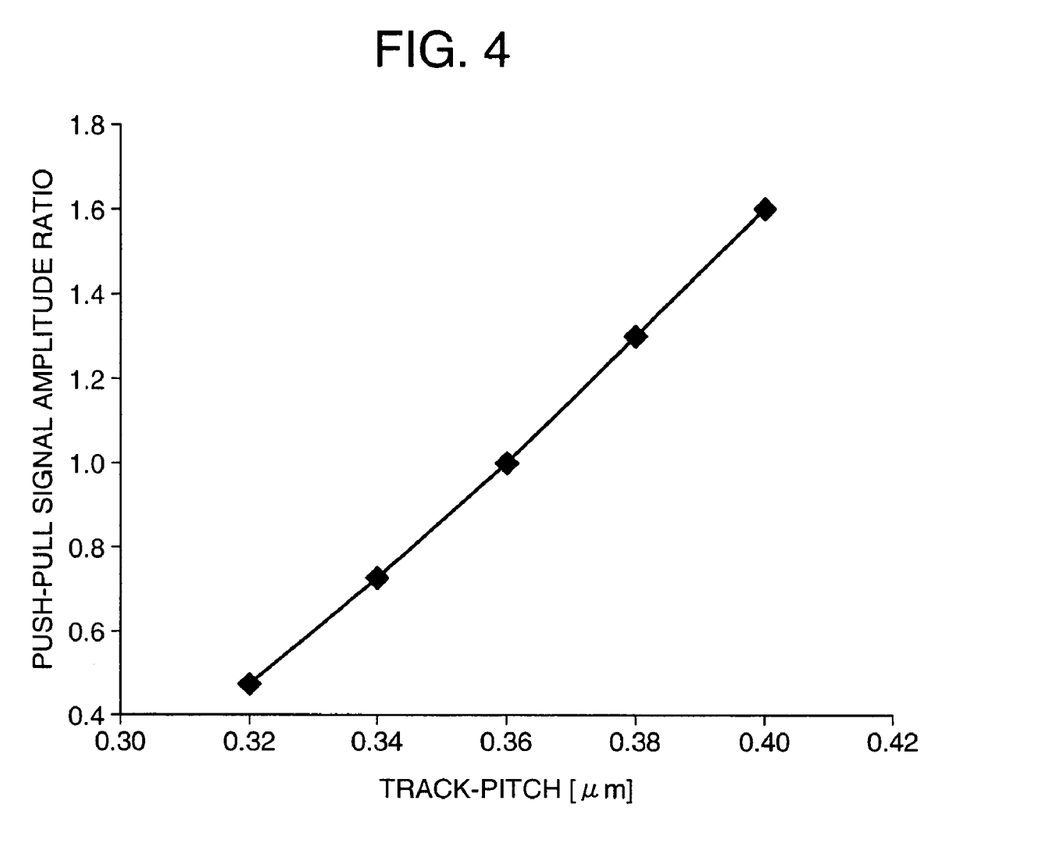
FIG. 4 is a graph for illustrating the track-pitch and the amplitude ratio between the push-pull signals.
Figure 5:
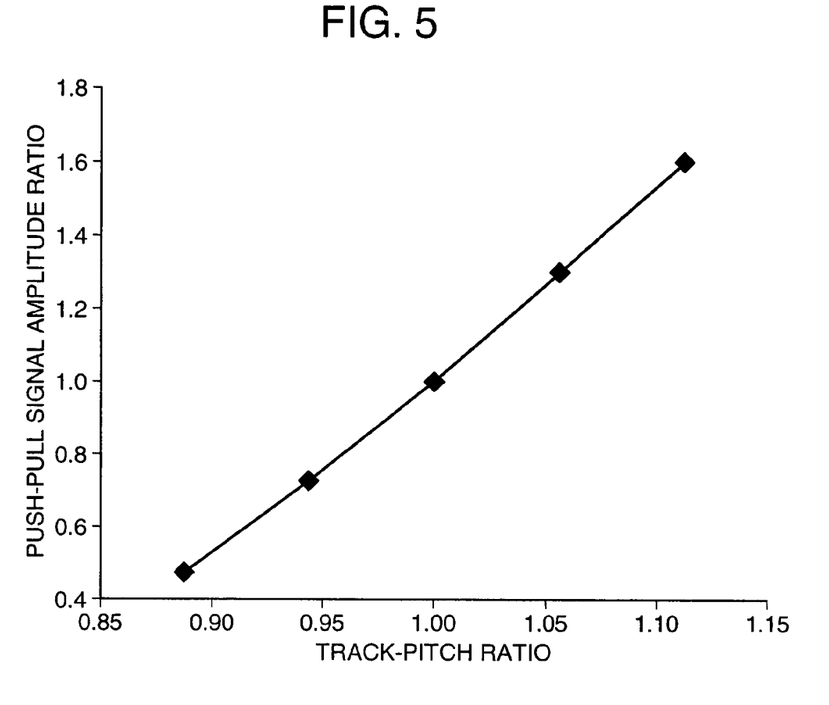
FIG. 5 is a graph for illustrating the track-pitch ratio and the amplitude ratio between the push-pull signals.

First, FIG. 4 illustrates an example of the amplitude ratio between the push-pull signals (: longitudinal axis) in the track-pitch ranging from 0.32 μm to 0.40 μm (: transverse axis). Since, as explained earlier, the amplitudes of the push-pull signals depend on the systems used, the amplitudes can be represented using the ratio therebetween. Moreover, here, if the track-pitch of the reproduction-specific area is equal to, e.g., 0.36 μm, the transverse axis in FIG. 4 can be converted into the ratio between the track-pitches by selecting the track-pitch of 0.36 μm as the reference. FIG. 5 which accompanies the specification illustrates this track-pitch ratio.

In FIG. 5, the push-pull signal amplitude ratio (: longitudinal axis) and the track-pitch ratio (: transverse axis) are in a proportional relationship. Accordingly, the relationship between the track-pitch ratio Rt and the push-pull signal amplitude ratio Rp can be represented as a straight-line equation below:

$$Rp = m \times Rt + n. \quad \text{(expression 8)}$$

Incidentally, here, m and n denote constants indicating the inclination and intercept of the straight line respectively. Substituting the (expression 8) into the (expression 7) gives the detection-sensitivity ratio Rk as $$Rk = (m \times Rt + n) \div Rt \quad \text{(expression 9)}$$
$$= m + n/Rt.$$

This shows that the detection-sensitivity ratio Rk is in an inversely proportional relationship to the track-pitch ratio Rt.

In the first area, since the track pitch is the reference track-pitch, the track-pitch ratio Rt is equal to 1. Consequently, from the (expression 9), the detection-sensitivity ratio is given by $$\text{the detection-sensitivity ratio } Rk = m + n. \quad \text{(expression 10)}$$

Here, when Rt is equal to 1, Rp=m+n holds from the (expression 8), and Rp=1 holds from FIG. 5. Namely, when Rt=1, m+n=1 holds, and accordingly, the (expression 10) becomes the detection-sensitivity ratio $Rk=1$.  (expression 11)

Meanwhile, letting the track-pitch ratio in a second area be Rt, the detection-sensitivity ratio is similarly given by the detection-sensitivity ratio $Rk=m+n/Rt$.  (expression 12)

Here, if a set value for the gain circuit 7 and a one for the gain circuit 8 are equal to each other, the ratio between the (expression 11) and the (expression 12) becomes equal to a ratio between tracking servo gains in the respective areas. Namely, the tracking servo gain in the second area becomes $(m+n/Rt) \div 1$  (expression 13)

times the tracking servo gain in the first area. In view of this situation, assuming that the gain coefficient in the first area set to the gain circuit 7 is equal to X, a value resulting from dividing X by the (expression 13) is set to the gain circuit 8. Namely, the gain coefficient Y in the second area is set at $Y = X \div (m+n/Rt)$.  (expression 14)

As a result of this setting, the tracking servo gains in the first and second areas become equal to each other.

As explained so far, in the first embodiment of the present invention, the value resulting from dividing, by the detection-sensitivity ratio Rk in the second area, the gain coefficient learned/adjusted in the reproduction-specific area is defined as the gain coefficient in the record/reproduction area. Here, the detection-sensitivity ratio Rk has been determined from the track-pitch ratio Rt. Additionally, the constants m and n are fixed by an optical disk drive which performs the tracking learning/adjustment.

As a result of this setting, even if the detection sensitivities have changed in the reproduction-specific area and the record/reproduction area respectively, making the switching between the gain circuit 7 and the gain circuit 8 allows the tracking servo loop itself to remain unchanged. This allows the implementation of the stable tracking-servo control.

Next, the explanation will be given below concerning a second embodiment of the present invention. Incidentally, in the above-described first embodiment, the constants m and n have been used in order to determine the devisor (m+n/Rt) in the above-described (expression 14). In this case, however, on account of an individual variation in the optical pickup, some variation occurs in the push-pull signal amplitudes, depending on an optical disk device to which the first embodiment is applied. As a result, a variation occurs in the constants m and n as well. Accordingly, in the second embodiment of the present invention, this type of problem will be solved. Namely, there is provided a method which, despite the individual variation in the optical pickup, allows the constants m and n to be determined with a high accuracy.

When the plural record areas whose track-pitches differ from each other are defined within the single disk, the respective areas are divided by the radius of the optical disk. Here, the push-pull signal amplitudes in the respective areas are measured in a manner of being made to correspond to positions of the respective areas and under one and the same tracking-gain setting condition. This measurement makes it possible to determine the inclination m and intercept n of the straight-line equation representing the relationship between the track-pitch ratio Rt and the push-pull signal amplitude ratio Rp illustrated in FIG. 5.

Incidentally, a block diagram used in the second embodiment of the present invention illustrates a configuration which is the same as that of the above-described first embodiment illustrated in FIG. 1. Consequently, the explanation thereof will be omitted. Additionally, FIG. 6 which accompanies the specification illustrates a flowchart for explaining the tracking learning method in this second embodiment. Hereinafter, the explanation will be given below in accordance with the flowchart in FIG. 6.

Figure 6:
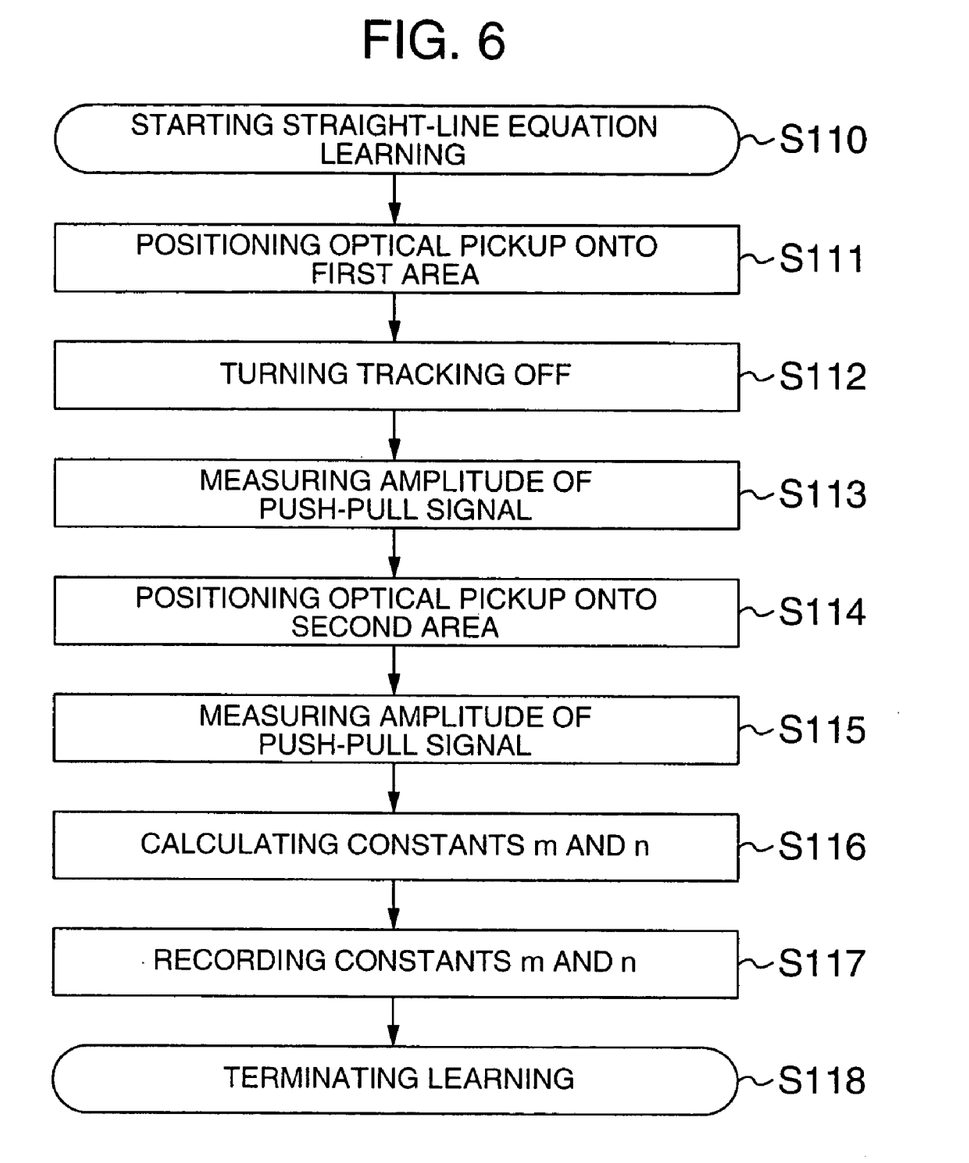
FIG. 6 is a flowchart for explaining a second embodiment of the present invention.

First, when the straight-line learning is started (step S110), the control circuit 21 positions the optical pickup 3 onto the first area (step S111). Incidentally, the first area is an area which becomes the reference track-pitch area. Next, the control circuit 21 outputs the Low-level signal as the TM signal, thereby turning the switch 11 OFF to turn the tracking control OFF (step S112). At this time, since the tracking control is in the OFF state, the push-pull signal illustrated in FIG. 2 appears. Then, the control circuit measures the amplitude of the push-pull signal, then storing the measured amplitude into a memory (step S113).

Next, the control circuit 21 displaces the position of the optical pickup 3 to the second area (step S114). Moreover, similarly to the case of the above-described first area, the control circuit measures the amplitude of the push-pull signal, then storing the measured amplitude into the memory (step S115).

After that, using the track-pitch ratio of the second area with respect to the first area, and the above-described first push-pull signal amplitude and second push-pull signal amplitude measured, the control circuit 21 calculates the inclination m and intercept n of the straight line representing the relationship between the track-pitch ratio Rt and the push-pull signal amplitude ratio Rp illustrated in FIG. 5 (step S116). Furthermore, the control circuit 21 records the inclination m and intercept n determined above into a non-volatile memory provided therein (step S117), then terminating the learning (step S118).

Here, at the above-described step S116, the inclination m and intercept n of the straight line illustrated in FIG. 5 can be determined in the following way: Here, assume that Tp1 is the reference track-pitch, Tp2 being the track-pitch in the second area, A1 being the push-pull signal amplitude in the reference track-pitch area, and A2 being the push-pull signal amplitude in the second area.

Namely, when selecting the first area as the reference area, the track-pitch ratios Rt in the first and second areas are equal to 1 and Tp2/Tp1, and similarly, the push-pull signal amplitude ratios are equal to 1 and A2/A1. The inclination m and intercept n of the straight line which passes through two points (Tp2/Tp1, A2/A1) and (1, 1) can be calculated by $m = (1 - A2/A1) \div (1 - Tp2/Tp1)$  (expression 15)

$n = (A2/A1 - Tp2/Tp1) \div (1 - Tp2/Tp1)$.  (expression 16)

Next, the explanation will be given below concerning a third embodiment of the present invention.

Figure 7:
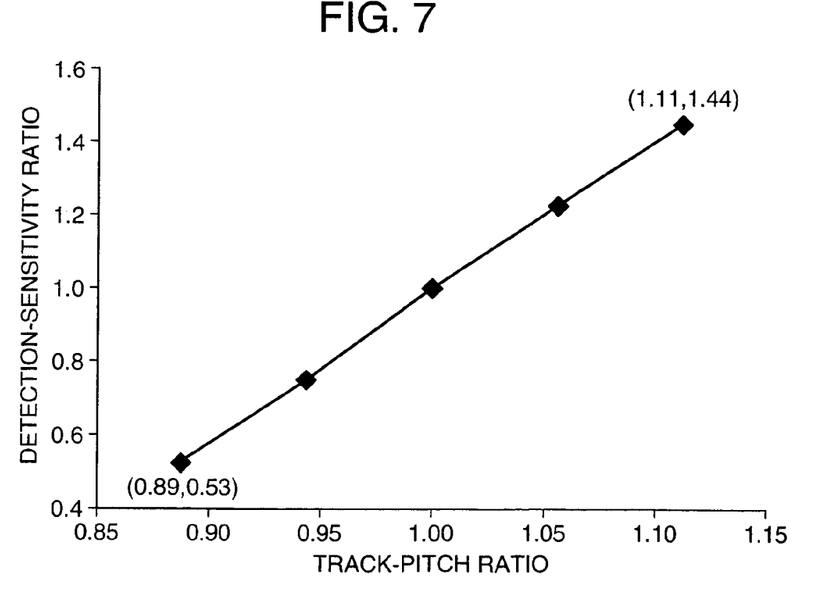
FIG. 7 is a graph for illustrating the track-pitch ratio and the detection-sensitivity ratio of the track shifts.

FIG. 5 explained earlier illustrates the relationship between the track-pitch ratio Rt and the push-pull signal amplitude ratio Rp. Meanwhile as was indicated in the (expression 7) described earlier, the detection-sensitivity ratio Rk can be determined from the detection-sensitivity ratio=the amplitude ratio÷the track-pitch ratio. From this, the relationship between the track-pitch ratio and the detection-sensitivity ratio is determined. FIG. 7 which accompanies the specification illustrates this relationship. In the (expression 9), the explanation has been given such that that the detection-sensitivity ratio Rk and the track-pitch ratio Rt are in the inversely proportional relationship. In FIG. 7, however, it can be assumed that, in proximity to the track-pitch ratio Rt=1, the relationship between the detection-sensitivity ratio Rk and the track-pitch ratio Rt can be substantially approximated by a proportional relationship. In FIG. 7, the inclination of a straight line connecting two points at both ends (0.89, 0.53) and (1.11, 1.44) is equal to $$(1.44-0.53) \div (1.11-0.89) = 4.14. \quad \text{(expression 17)}$$

Then, using this inclination, the straight line passing through a point (1.0, 1.0) is approximated as a straight line indicating the relationship between Rt and Rk. This approximation represents the straight line as $$Rk = 4.14 \times Rt + (1-4.14). \quad \text{(expression 18)}$$

Additionally, the reason why the intercept (1-4.14) is left uncalculated in the above-described (expression 18) is that the coefficient 4.14 is utilized as a parameter in the (expression 18).

In the above-described situation, if the set value for the gain circuit 7 whose tracking learning/adjustment has been performed in the reproduction-specific area is equal to G1, the set value for the gain circuit 8 in the record/reproduction area with the track-pitch ratio Rt=0.95 is determined. From the above-described (expression 18), the detection-sensitivity ratio Rk at Rt=0.95 becomes equal to $$Rk = 4.14 \times 0.95 + (1-4.14) = 0.793. \quad \text{(expression 19)}$$

Consequently, if the set value for the gain circuit 7 and the one for the gain circuit 8 are made equal to each other, the tracking gain in the record/reproduction area becomes smaller, i.e., 0.793 times the original tracking gain. Accordingly, the value resulting from multiplying the set value for the gain circuit 7 by β (=1/0.793) is set to the gain circuit 8.

As a result of this setting, even if the detection sensitivities have changed in the reproduction-specific area and the record/reproduction area respectively, making the switching between the gain circuit 7 and the gain circuit 8 allows the tracking servo loop itself to remain unchanged. This allows the implementation of the stable tracking-servo control.

As explained so far, in the third embodiment of the present invention, the relationship between the detection-sensitivity ratio Rk and the track-pitch ratio Rt is approximated as the proportional relationship. Then, the value resulting from multiplying, by the coefficient β, the gain coefficient learned/adjusted in the reproduction-specific area is defined as the gain coefficient in the record/reproduction area. Here, the coefficient β is the inverse of the detection-sensitivity ratio Rk determined from the track-pitch ratio Rt. Incidentally, this detection-sensitivity ratio Rk can be determined from $$Rk = K \times Rt + (1-K). \quad \text{(expression 20)}$$

using the track-pitch ratio Rt and a constant K which is the inclination of the straight line indicating the relationship between Rt and the detection-sensitivity ratio Rk. Additionally, the constant K is fixed by an optical disk drive which performs the tracking learning/adjustment.

Incidentally, in the third embodiment of the present invention explained above, as the method for the tracking gain learning/adjustment in the reproduction-specific area, the explanation has been given providing the method of making the amplitude of the acquired push-pull signal equal to a predetermined amplitude. The present invention, however, is not limited thereto. For example, the following method or the like is available: An external disturbance with a predetermined frequency is injected into the tracking servo loop. Next, a comparison is made between the external disturbance injected and the signal, then adjusting the set value for the gain circuit 7 so that the phase difference therebetween will become equal to a predetermined phase difference. Here, the signal has returned after making a one-round trip along the tracking servo loop.

Next, the explanation will be given below concerning a fourth embodiment of the present invention. Incidentally, in the above-described third embodiment, the constant K has been used in the above-described (expression 20) in order to determine the detection-sensitivity ratio Rk. On account of an individual variation in the optical pickup, however, a variation occurs in this constant K, depending on an optical disk device to which the third embodiment is applied. Accordingly, in the fourth embodiment of the present invention, this type of problem will be solved. Namely, there is provided a method which, despite the individual variation in the optical pickup, allows the constant K to be determined with a high accuracy.

When the plural record areas whose track-pitches differ from each other are defined within the single disk, the respective areas are divided by the radius of the optical disk. Here, the gain adjustment is performed in a manner of being made to correspond to positions of the respective areas so that the tracking servo characteristics will become identical to each other. As a result of this adjustment, it turns out that the ratio among the respective adjusted values represents the ratio among the detection sensitivities. Namely, determining the ratio among the gains in the respective areas makes it possible to determine the relationship between the ratio among the track-pitches and the ratio among the detection sensitivities.

Incidentally, a block diagram used in the fourth embodiment of the present invention illustrates a configuration which is the same as that of the above-described third embodiment illustrated in FIG. 1. Consequently, the explanation thereof will be omitted. Additionally, FIG. 8 which accompanies the specification illustrates a flowchart for explaining the tracking learning method in this fourth embodiment. Hereinafter, the explanation will be given below in accordance with the flowchart in FIG. 8.

Figure 8:
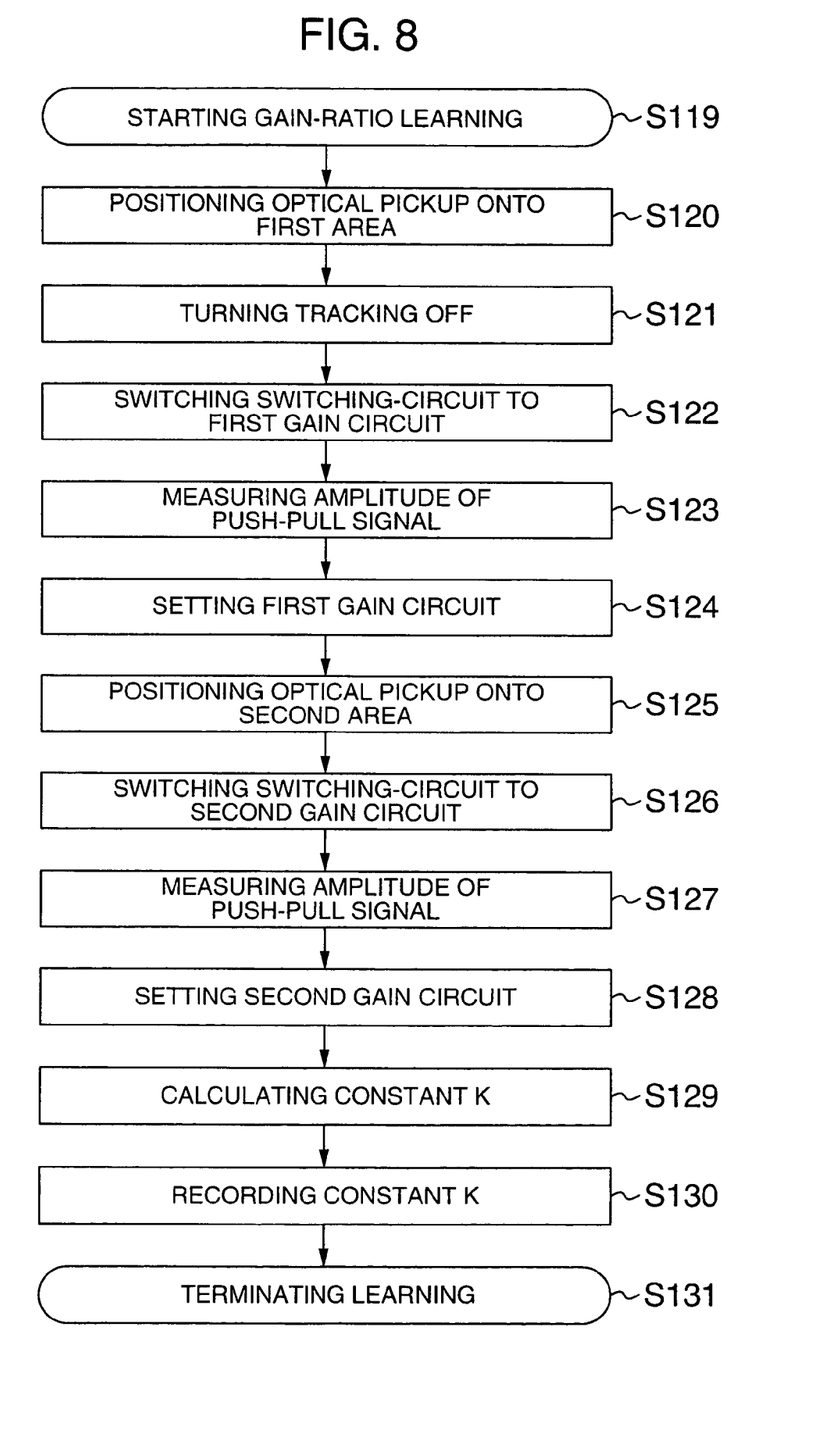
FIG. 8 is a flowchart for explaining a fourth embodiment of the present invention.

First, when the gain-ratio learning is started (step S119), the control circuit 21 positions the optical pickup 3 onto the first area (step S120). Incidentally, the first area is an area which becomes the reference track-pitch area. Next, the control circuit 21 outputs the Low-level signal as the TM signal, thereby turning the switch 11 OFF to turn the tracking control OFF (step S121). Moreover, the control circuit 21 outputs the Low-level signal as the SEL signal, thereby switching the switching circuit 9 to the first gain circuit 7 on the input side (a) (step S122). At this time, since the tracking control is in the OFF state, the push-pull signal illustrated in FIG. 2 explained earlier appears as expected. Then, the control circuit measures the amplitude of the push-pull signal (step S123). Furthermore, the control circuit 21 adjusts the set value for the first gain circuit 7 so that the amplitude will become equal to a first predetermined value (step S124). Namely, the operations so far cause the tracking servo gain in the first area to exhibit the predetermined characteristic.

Next, the control circuit 21 displaces the position of the optical pickup 3 to the second area (step S125). Moreover, the control circuit 21 outputs a High-level signal as the SEL signal, thereby switching the switching circuit 9 to the second gain circuit 8 on the input side (b) (step S126). After that, similarly to the case of the above-described first area, the control circuit measures the amplitude of the push-pull signal (step S127). Furthermore, the control circuit 21 adjusts a set value for the second gain circuit 8 so that the amplitude will become equal to a second predetermined value (step S128). Incidentally, the above-described first and second predetermined values are target values of the push-pull signal amplitudes which have been determined in advance so that the tracking servo characteristics in the above-described first and second areas will become equal to each other. Namely, the operations so far cause the tracking servo characteristics in the first and second areas to become identical to each other.

After that, using the track-pitch ratio of the second area with respect to the first area, and the above-described adjusted set value for the first gain circuit 7 and set value for the second gain circuit 8, the control circuit 21 calculates the inclination K of the straight line indicating the relationship between the track-pitch ratio and the detection-sensitivity ratio illustrated in FIG. 6 described earlier (step S129). In addition, the control circuit 21 records the inclination K determined above into a non-volatile memory provided therein (step S130), then terminating the learning (step S131).

Here, at the above-described step S129, the inclination K of the straight line illustrated in FIG. 6 can be determined in the following way: Here, assume that Tp1 is the reference track-pitch, Tp2 being the track-pitch in the second area, G1 being the adjusted value in the reference track-pitch area, i.e., the set value for the first gain circuit 7, and G2 being the adjusted value in the second area, i.e., the set value for the second gain circuit 8.

Namely, when giving consideration with the track-pitch Tp1 in the area 1 selected as the reference, from the (expression 20), the detection-sensitivity ratio Rk (Tp1) in the area 1 is given by $$Rk(Tp1)=K\times(Tp1/Tp1)+(1-K)=1. \quad \text{(expression 21)}$$

Also, the detection-sensitivity ratio Rk (Tp2) in the area 2 is similarly given by $$Rk(Tp2)=K\times(Tp2/Tp1)+(1-K). \quad \text{(expression 22)}$$

Here, the tracking servo characteristics in the area 1 and area 2 are requested to become equal to each other. This request requires that $$G1\times Rk(Tp1)=G2\times Rk(Tp2). \quad \text{(expression 23)}$$

hold. Consequently, K can be determined as $$K=(1-G1/G2)+(1-Tp2/Tp1). \quad \text{(expression 24)}$$

Namely, according to the present invention, even in the optical disk which includes, within the single disk, the plural record areas whose track-pitches differ from each other, through the execution of only the computation from the value acquired by the adjustment of the tracking servo gain in a partial area thereof, it is possible to acquire the tracking servo gain in another area whose track-pitch differs from that of the partial area. This allows the implementation of the optical disk device which makes it possible to perform the excellent record/reproduction operation by adjusting the tracking servo gain (i.e., parameter) in a short time and with a high accuracy.

Incidentally, it is desirable that the above-described learning in the second and fourth embodiments be recorded into the non-volatile memory inside the optical disk device before shipping the device from a factory. The reason for this is as follows: If, after the shipment, the push-pull signal amplitude measurement or the tracking gain learning is performed in the respective areas in such a manner that the pickup is positioned onto the plural respective areas every time the optical disk is loaded, the time needed for the learning/adjustment becomes longer. On the other hand, if, as described above, the result acquired by the learning has been recorded into the non-volatile memory before shipping the device from the factory, it is well enough to learn the constants m and n or K one time at the factory shipment time. As a result, when a user uses this shipped optical disk device, as explained in the first or third embodiment of the present invention for example, even in the optical disk which includes, within the single disk, the plural record areas whose track-pitches differ from each other, it is well enough to perform the learning one time in only the reference track-pitch area. This allows the implementation of the short-time adjustment.

In the above-described first to fourth embodiments according to the present invention explained so far, the generation method of the tracking error signal has been explained by employing the Push-Pull method as its one example. It is needles to say, however, that the present invention is not limited thereto, and that some other method, e.g., the publicly-known differential Push-Pull method may be used which has been devised in order to eliminate the direct-current offset in response to lens shift.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A tracking learning/adjusting method in recording optical disk having a groove-shaped track structure and including, within a single disk, plural record areas of which track-pitches differ from each other, said tracking learning/adjusting method comprising the steps of:
    displacing an optical detector into a reference track-pitch area which is one of said plural record areas, said optical detector being used for reading information recorded in said optical disk,
    adjusting a tracking gain so that a tracking servo gain in said reference track-pitch area may exhibit a predetermined characteristic,
    calculating, from a value of said tracking gain acquired by said adjustment, a tracking gain in another track-pitch area of which a track-pitch differs from said reference track-pitch, and
    adjusting thereby tracking gains in said plural record areas.

2. The tracking learning/adjusting method according to claim 1, wherein said track-pitch of said reference track-pitch area is larger than said track-pitch of said another track-pitch area.

3. The tracking learning/adjusting method according to claim 1, wherein said reference track-pitch area where said adjustment of said tracking gain is performed is a reproduction-specific area of said optical disk.

4. The tracking learning/adjusting method according to claim 1, wherein said adjustment of the tracking gain is performed using the amplitude of a tracking error signal.

5. The tracking learning/adjusting method according to claim 4, wherein said tracking error signal is generated using either of a Push-Pull method and a differential Push-Pull method.

6. The tracking learning/adjusting method according to claim 4, wherein a generation method of said tracking error signal is common to all of said plural record areas of which track-pitches differ from each other.

7. The tracking learning/adjusting method according to claim 1, wherein said adjustment method of said tracking gain in said reference track-pitch area comprises the steps of:
injecting an external disturbance with a predetermined frequency into a tracking servo loop, and
making said adjustment so that a phase difference between said external disturbance injected and a signal may become equal to a predetermined value, said signal having returned after making a one-round trip along said loop.

8. The tracking learning/adjusting method according to claim 1, wherein said tracking gain Y in said another track-pitch area is determined using the following expression:

$$Y = X \div (m + n/Rt),$$

where X indicates said value acquired by said adjustment, Rt indicates a ratio between said another track-pitch and said reference track-pitch, and m and n indicate constants.

9. The tracking learning/adjusting method according to claim 8, wherein said constants m and n are recorded into a non-volatile memory after having been calculated once.

10. The tracking learning/adjusting method according to claim 8, wherein said constants m and n are determined using the following expressions:

$$m = (1 - A2/A1) \div (1 - Tp2/Tp1)$$

$$n = (A2/A1 - Tp2/Tp1) \div (1 - Tp2/Tp1),$$

where Tp1 is said track-pitch in said reference track-pitch area, Tp2 is said track-pitch in said another track-pitch area, A1 is a push-pull signal amplitude in said reference track-pitch area, and A2 is a push-pull signal amplitude in said another track-pitch area.

11. The tracking learning/adjusting method according to claim 1, wherein said tracking gain Y in said another track-pitch area is determined using the following expression:

$$Y = X \div \{K \times Rt + (1K)\},$$

where X is said value acquired by said adjustment, Rt is a ratio between said another track-pitch and said reference track-pitch, and K is a constant.

12. The tracking learning/adjusting method according to claim 11, wherein said constant K is recorded into a non-volatile memory after having been calculated once.

13. The tracking learning/adjusting method according to claim 11, wherein said constant K is determined using the following expression:

$$K = (1 - G1/G2) \div (1 - Tp2/Tp1),$$

where Tp1 is said track-pitch in said reference track-pitch area, Tp2 is said track-pitch in said another track-pitch area, G1 is said tracking-gain adjusted value in said reference track-pitch area, and G2 is said tracking-gain adjusted value in said another track-pitch area.

14. An optical disk device for optically performing reproduction of recorded information from a recording optical disk, or record/reproduction of information into/from said optical disk, said optical disk having a groove-shaped track structure and including, within a single disk, plural record areas whose track-pitches differ from each other, said optical disk device comprising:

an optical detector for reading information recorded in said optical disk;
computation means for computing a tracking error signal on the basis of said optical detector;
displacement means for displacing said optical detector into a reference track-pitch area which is one of said plural record areas;
gain means for adjusting a set value of a tracking servo gain for each of said areas of which track-pitches differ from each other; and
gain adjustment means for adjusting said set value by said gain means so that said tracking servo gain in said reference track-pitch area may exhibit a predetermined characteristic,
wherein said gain means calculates, from said set value, set values of tracking servo gains in said track-pitch areas other than said reference track-pitch area, said set value being adjusted in said reference track-pitch area by said gain adjustment means.

15. The optical disk device according to claim 14, wherein said track-pitch of said reference track-pitch area is larger than said track-pitch of track-pitch areas other than said reference track-pitch area.

16. The optical disk device according to claim 14, wherein said reference track-pitch area where said adjustment of said tracking gain is performed is a reproduction-specific area of said optical disk.

17. The optical disk device according to claim 14, further comprising
amplitude measurement means for detecting amplitude of said tracking error signal when said adjustment of said tracking gain is performed,
wherein said gain adjustment means performs said adjustment so that said amplitude of said tracking error signal in said reference track-pitch area will become equal to a predetermined amplitude.

18. The optical disk device according to claim 17, wherein said tracking error signal is generated using either of a Push-Pull method and a differential Push-Pull method.

19. The optical disk device according to claim 17, wherein a generation method of said tracking error signal is common to all of said plural record areas of which track-pitches differ from each other.

20. The optical disk device according to claim 14, further comprising
external-disturbance injection means for injecting an external disturbance with a predetermined frequency into a tracking servo loop, and
phase-difference measurement means for measuring a phase difference between said external disturbance injected and said signal which has returned after making a one-round trip along said servo loop,
wherein said adjustment is made so that the measurement value by said phase-difference measurement means will become equal to a predetermined value.

21. The optical disk device according to claim 14, wherein said tracking gain Y in said another track-pitch area is determined using the following expression:

$$Y = X \div (m + n/Rt),$$

where X is said value acquired by said adjustment, Rt is a ratio between said reference track-pitch and track-pitch areas other than said reference track-pitch area, and m and n are constants.

22. The optical disk device according to claim 21, wherein said constants m and n are recorded into a non-volatile memory after having been calculated once.

23. The optical disk device according to claim 22, wherein said constants m and n are determined using the following expressions:

$$m=(1-A2/A1)\div(1-Tp2/Tp1)$$

$$n=(A2/A1-Tp2/Tp1)\div(1-Tp2/Tp1),$$

where Tp1 is said track-pitch in said reference track-pitch area, Tp2 is said track-pitch in track-pitch areas other than said reference track-pitch area, A1 is a push-pull signal amplitude in said reference track-pitch area, and A2 is a push-pull signal amplitude in said track-pitch areas other than said reference track-pitch area.

24. The optical disk device according to claim 14, wherein said tracking gain Y in said another track-pitch area is determined using the following expression:

$$Y=X\div\{K\times Rt+(1-K)\},$$

where X is said value acquired by said adjustment, Rt is a ratio between said reference track-pitch and track-pitch areas other than said reference tack-pitch area, and K is a constant.

25. The optical disk device according to claim 24, wherein said constant K is recorded into a non-volatile memory after having been calculated once.

26. The optical disk device according to claim 24, wherein said constant K is determined using the following expression:

$$K=(1-G1/G2)\div(1-Tp2/Tp1),$$

where Tp1 is said track-pitch in said reference track-pitch area, Tp2 is said track-pitch in track-pitch areas other than said reference track-pitch area, G1 is said tracking-gain adjusted value in said reference track-pitch area, and G2 is said tracking-gain adjusted value in said track-pitch areas other than said reference track-pitch area.

* * * * *